US012670682B2

(12) United States Patent
Chen

(10) Patent No.: US 12,670,682 B2
(45) Date of Patent: Jun. 30, 2026

(54) CHAMFER TOOL FOR VOLUMETRIC SCULPTING

(71) Applicant: Adobe Inc., San Jose, CA (US)

(72) Inventor: Zhiqin Chen, Seattle, WA (US)

(73) Assignee: Adobe Inc., San Jose, CA (US)

( * ) Notice: Subject to any disclaimer, the term of this patent is extended or adjusted under 35 U.S.C. 154(b) by 150 days.

(21) Appl. No.: 18/895,167

(22) Filed: Sep. 24, 2024

(65) Prior Publication Data

US 2026/0087756 A1     Mar. 26, 2026

(51) Int. Cl.
G06T 19/20       (2011.01)
G06T 15/08       (2011.01)

(52) U.S. Cl.
CPC .............. G06T 19/20 (2013.01); G06T 15/08 (2013.01); *G06T 2200/24* (2013.01); *G06T 2210/21* (2013.01); *G06T 2219/2021* (2013.01)

(58) Field of Classification Search
CPC ......... G06T 19/00; G06T 19/20; G06T 17/00; G06T 17/10; G06T 17/20; G06F 30/00–18
See application file for complete search history.

(56) References Cited

U.S. PATENT DOCUMENTS

| | | | |
|---|---|---|---|
| 2019/0179288 A1* | 6/2019 | Wike ..................... | B29C 64/386 |
| 2022/0156430 A1* | 5/2022 | Lambourne ............. | G06F 30/17 |
| 2022/0304782 A1* | 9/2022 | Derzapf ............. | A61C 13/0006 |
| 2023/0252207 A1* | 8/2023 | Goswami ................ | G06F 30/10 |
| | | | 703/1 |

* cited by examiner

*Primary Examiner* — Ryan Mcculley
(74) *Attorney, Agent, or Firm* — FIG. 1 Patents

(57)          ABSTRACT

In implementations of techniques and systems for chamfer tools in volumetric sculpting software, a processing device receives an indication of a brushed region of a three-dimensional (3D) object to be chamfered and a chamfer size. A machine-learning model determines surface voxels in the brushed region representing an edge or corner voxel. The machine-learning model also determines parameters for the edge or corner voxel that define a chamfer plane and a chamfer coefficient. The chamfer plane is then moved in a direction normal to the chamfer plane by a distance based on the chamfer size and the chamfer coefficient. To generate a chamfer, the processing device performs an addition or subtraction operation on the 3D object to the moved chamfer plane for the edge or corner voxel.

20 Claims, 7 Drawing Sheets

Figure 2:
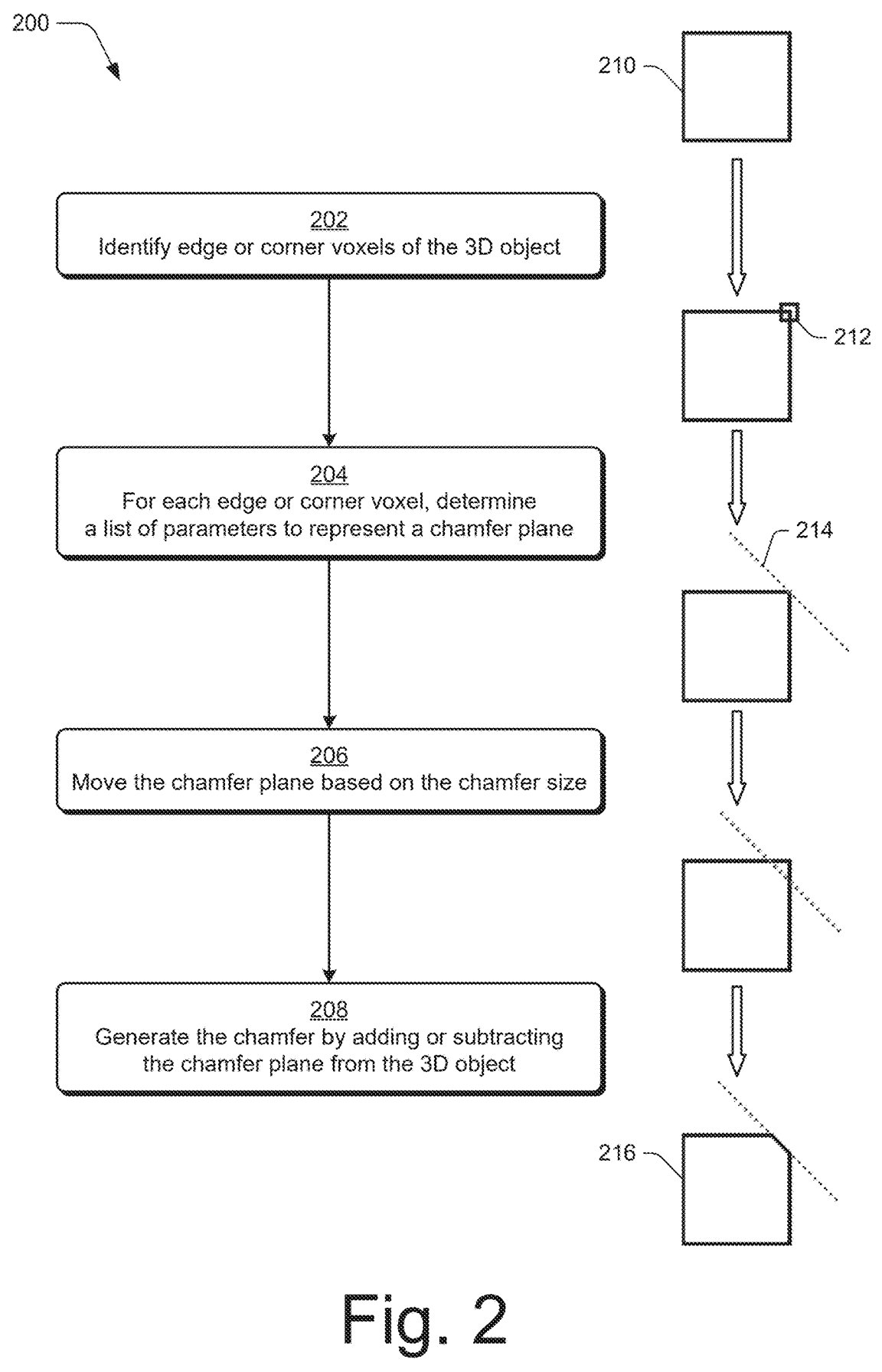

200

210

212

214

216

| 202 |
| Identify edge or corner voxels of the 3D object |

| 204 |
| For each edge or corner voxel, determine a list of parameters to represent a chamfer plane |

| 206 |
| Move the chamfer plane based on the chamfer size |

| 208 |
| Generate the chamfer by adding or subtracting the chamfer plane from the 3D object |

Platform 716

Resources 718

Cloud 714

Computing Device 702

Processing Device 704

Hardware Elements 710

Computer-readable Media 706

Memory/ Storage 712

I/O Interfaces 708

Chamfer Tool 116

CHAMFER TOOL FOR VOLUMETRIC SCULPTING

BACKGROUND

Chamfer tools are frequently used in three-dimensional (3D) modeling to alter the edges of a solid object by creating a bevel. In simpler terms, chamfer tools enable a designer to incline sharp edges inward or outward to create a more realistic or visually captivating model. However, chamfer tools are specifically designed to operate on polygon meshes or parametric shapes and cannot be used in 3D modeling software based on volumetric sculpting.

SUMMARY

Techniques and systems for chamfer tools in volumetric sculpting software are described. In one example, a processing device receives an indication of a brushed region of an object to be chamfered and a chamfer size. A machine-learning model determines parameters defining a chamfer plane and chamfer coefficient for each edge or corner voxel in the brushed region. The processing device moves each chamfer plane in a direction normal to the chamfer plane by a distance based on the chamfer size and the chamfer coefficient. To generate the chamfer, the processing device performs an addition or subtraction operation to the moved chamfer planes.

This Summary introduces a simplified selection of concepts described below in the Detailed Description. As such, this Summary is not intended to identify essential features of the claimed subject matter or to aid in determining its scope.

BRIEF DESCRIPTION OF THE DRAWINGS

The detailed description is described with reference to the accompanying figures. Entities represented in the figures indicate one or more entities, and thus, reference is made interchangeably to single or plural forms of the entities in the discussion.

FIG. 2 is a flow diagram depicting an algorithm as a step-by-step procedure in an example implementation of operations performable for accomplishing chamfer tool techniques in volumetric sculpting software.

DETAILED DESCRIPTION

Overview

The movie industry and the visual effects community employ volumetric sculpting tools to create realistic digital objects and characters. For example, chamfer tools are commonly used when creating 3D models to smooth out sharp edges to provide a more realistic and visually appealing look. However, chamfer tools for 3D modeling software based on volumetric sculpting have not been developed. This document introduces techniques and systems for a chamfer tool in volumetric sculpting software.

Conventional techniques for volumetric sculpting store signed distances in voxel grids and then run an algorithm (e.g., marching cubes, dual contouring, dual marching cubes) to extract a mesh for modeled objects. A voxel, short for volumetric pixel, is the 3D equivalent of a pixel in a 2D image. Voxels are generally tiny cubes within a 3D grid that combine to create a 3D representation of a modeled object. Each voxel holds a value that represents one or more object properties (e.g., color, density, material type) and signed distances.

Signed distances represent the geometry of modeled objects using a mathematical function. Instead of defining a 3D object with a set of polygons (e.g., triangles and squares), signed distances use a function that takes a point in 3D space as input and returns a value indicating the distance to the closest surface of the object. The sign of the value indicates whether the point is inside (e.g., a negative value) or outside (e.g., a positive value) the object. On the surface of the object, the value is equal to zero.

The systems and techniques described herein introduce a chamfer tool for volumetric sculpting applied directly on signed distance field (SDF) voxels. The chamfer tool is implemented as a brush tool with a chamfer created in the brushed region. The described chamfer tool uses a machine-learning model (e.g., a neural network) to detect sharp edges and corners and predict relevant parameters for the chamfer operation. The chamfer is created by performing local constructive solid geometric (CSG) operations directly on voxels within the brushed region. In this way, the described systems and techniques make the chamfer tool available for modeling software that utilizes volumetric sculpting.

The following discussion describes an example environment that employs the techniques described herein. Example procedures are also described as performable in the example and other environments. Consequently, the performance of the example procedures is not limited to the example environment, and the example environment is not limited to the performance of the example procedures.

Example Volumetric Sculpting Environment

Figure 1:
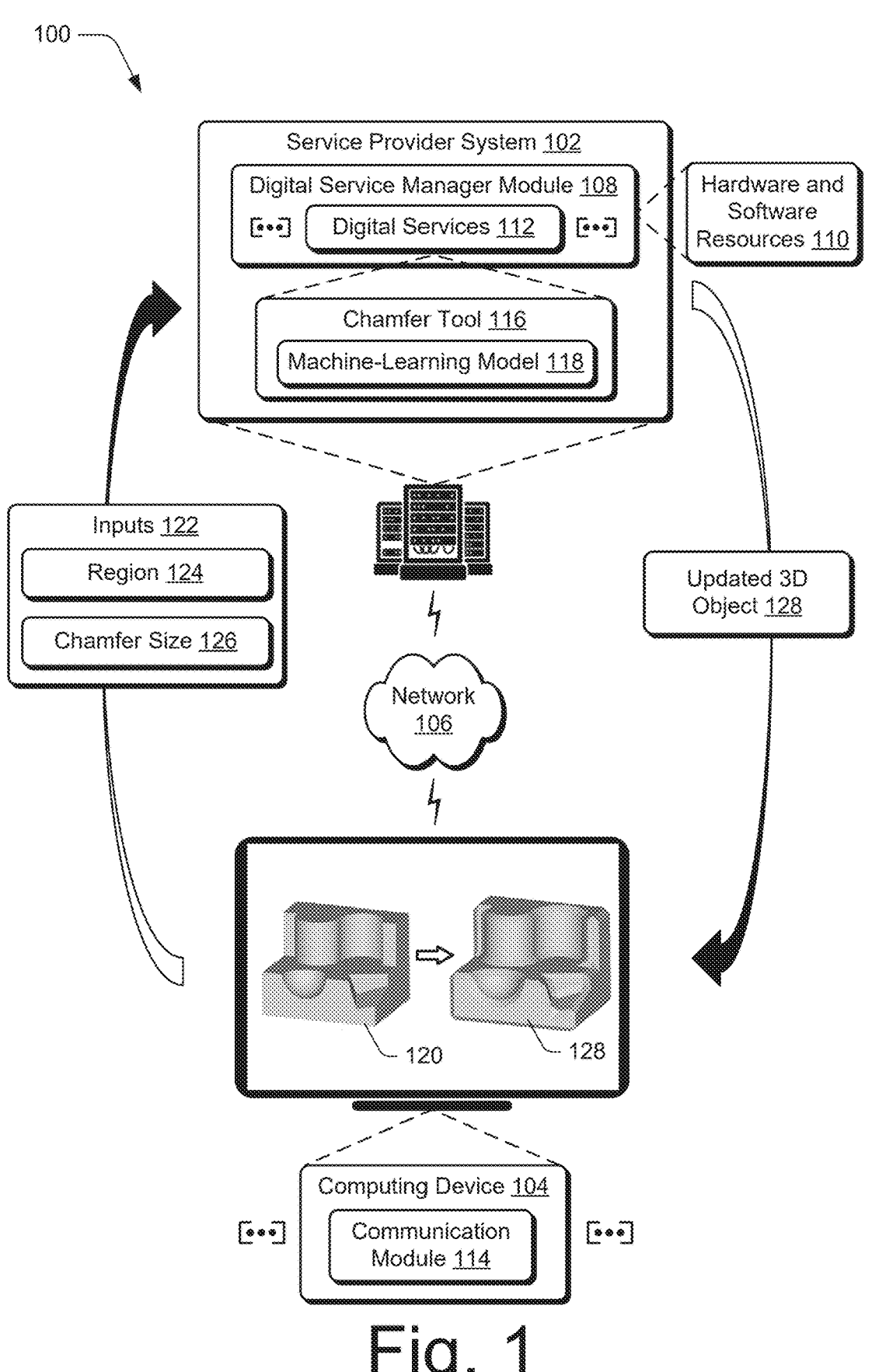
FIG. 1 illustrates a digital medium environment in an example implementation that is operable to employ chamfer tools for volumetric sculpting as described herein.

FIG. 1 illustrates a digital medium environment 100 in an example implementation that is operable to employ chamfer tools for volumetric sculpting as described herein. The illustrated digital medium environment 100 includes a service provider system 102 and a computing device 104 that are communicatively coupled, one to another, via a network 106. Computing systems for the service provider system 102 and the computing device 104 are configurable in various ways. For instance, computing device 104 is associated with a user, and service provider system 102 is a remote computing system (e.g., one or more servers) configured to employ the described techniques and systems for a chamfer tool.

A computing system, for instance, is configurable as a desktop computer, laptop computer, mobile device (e.g., assuming a handheld configuration such as a tablet or mobile phone), server, and so forth. Thus, the service provider system 102 or the computing device 104 can range from a full-resource device with substantial memory and processor resources (e.g., servers and personal computers) to a low-resource device with limited memory and/or processing resources (e.g., some mobile devices). Additionally, although a single computing device is shown for the computing device 104 and described in instances in the following discussion, a computing system is also representative of a plurality of different devices, such as multiple servers utilized by a business to perform operations "over the cloud" for the service provider system 102 and as further described with FIG. 7.

The service provider system 102 includes a digital service manager module 108 implemented using hardware and software resources 110 (e.g., a processing device and computer-readable storage medium) to support one or more digital services 112. Digital services 112 are made available remotely via the network 106 to computing devices, e.g., computing device 104.

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the digital services 112 via the network 106. A result of processing using the digital services 112 is then returned to the computing device 104 via the network 106.

In the illustrated digital medium environment 100, the digital services 112 include a chamfer tool 116 as part of a 3D modeling service. The chamfer tool 116 allows users to apply chamfers to 3D objects within volumetric sculpting software. Although illustrated as implemented remotely by the service provider system 102, the functionality of the chamfer tool 116 is also configurable for local implementation, e.g., as part of the computing device 104.

The chamfer tool 116 works directly on SDF voxels to add chamfers, so it is useable in volumetric sculpting software. In particular, the chamfer tool 116 utilizes a machine-learning model 118 to identify edges and corners in an original 3D object 120 and determine a set of parameters for a plane that defines the addition or subtraction operation. In one implementation, a brush tool is used to provide inputs 122, which include a region 124 to be chamfered and a size 126 of the chamfer, to the chamfer tool 116.

For any voxels on the surface of the 3D object 120, the machine-learning model 118 determines whether that voxel represents an edge or corner of the shape. The machine-learning model 118 then determines a list of parameters to represent a chamfer plane (e.g., a half-space) for generating the chamfer. Once the list of parameters has been defined for each edge and corner voxel, the chamfer tool 116 moves the chamfer plane based on the chamfer size 126. The chamfer plane is then used to perform an addition or subtraction operation on the 3D object 120 to generate an updated 3D object 128, as illustrated in FIG. 1. In this way, the chamfer tool 116 performs local geometry operations within the brushed region directly on voxels storing signed distances to create chamfers in volumetric sculpting software.

In general, functionality, features, and concepts described in the examples above and below are employed in the context of the example procedures described in this section. Further, functionality, features, and concepts described with different figures and examples in this document are interchangeable and are not limited to implementation in the context of a particular figure or procedure. Moreover, blocks associated with different representative procedures and corresponding figures herein are applicable together and/or combinable in different ways. Thus, individual functionality, features, and concepts described with different example environments, devices, components, figures, and procedures herein are usable in any suitable combinations and are not limited to the particular combinations represented by the enumerated examples in this description.

Example Chamfer Tool Procedure for Volumetric Sculpting

The following discussion describes chamfer tool techniques for volume sculpting that are implementable utilizing the described systems and devices. Aspects of each procedure are implemented in hardware, firmware, software, or a combination thereof. The procedure is illustrated as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions, thereby creating a special-purpose machine for carrying out an algorithm as illustrated by the flow diagram. As a result, the instructions are stored on a computer-readable storage medium that causes the hardware to perform the algorithm, e.g., responsive to the execution of the instructions. In portions of the following discussion, reference will be made to FIG. 1.

FIG. 2 is a flow diagram depicting an algorithm as a step-by-step procedure 200 in an example implementation of operations performable for accomplishing chamfer tool techniques in volumetric sculpting software. In this example, a processing device of the chamfer tool 116 receives inputs 122 that identify a region 124 and chamfer size 126 for applying a chamfer to a 3D object 210, which is illustrated here as a 2D object for illustration purposes. The machine-learning model 118 processes the voxels in region 124 and determines which voxels on the object's surface represent edges or corners (e.g., corner voxel 212) of the 3D object 210 (block 202).

In one implementation, the machine-learning model 118 is a multilayer perceptron (MLP), a neural network architecture that includes multiple layers of interconnected nodes (e.g., artificial neurons). MLPs generally include three types of layers: an input layer, a hidden layer, and an output layer. The input layer receives the initial data (e.g., region 124 and signed distance values of voxels therein) that the network processes. Each node in the input layer represents a single feature or value from the input data. In one implementation, the input to the MLP is a 64-dimensional (64-d) vector storing the signed distances for the 4×4×4 neighbor voxels of the target voxel (e.g., a 4×4×4 voxel grid surrounding the target surface voxel, which represents a voxel on the surface of the object).

MLPs include one or more hidden layers, each including multiple artificial neurons that communicate with each other through weighted connections. The output layer provides the final results of the MLP's computation, with the number of nodes depending on the problem. Each neuron in the hidden and output layers applies an activation function to its input to introduce non-linearity into the network. In one implementation, the output is a nine-dimensional (9-d) vector for the target voxel (as described in greater detail with respect to block 204).

For each surface voxel, the machine-learning model 118 determines a list of parameters to determine whether the surface voxel represents or contains an edge or corner voxel (e.g., corner voxel 212 in FIG. 2). As described above, the machine-learning model 118 determines nine parameter values for each voxel with the first four parameters being used to identify edge and corner voxels.

The parameters include a convex flag and a concave flag to determine whether the voxel is a convex edge or corner, concave edge or corner, or neither. For example, a voxel represents a convex edge or corner if the convex flag equals one and the concave flag equals zero. Similarly, a concave edge or corner is represented by a convex flag equal to zero and a concave flag equal to one. A voxel does not represent a corner or edge if the convex and concave flags equal zero.

The parameters also include a corner flag to determine whether the voxel contains a convex or concave corner. A convex corner is made of just convex edges. Similarly, a concave corner is made of just concave edges. A joint flag indicates whether the voxel contains a joint corner of convex and concave edges. A joint corner with more convex edges than concave edges is considered a convex joint corner, and vice versa. These four parameter values (e.g., convex flag, concave flag, corner flag, and joint corner flag) are determined for each surface voxel and represent Boolean values.

Figure 3:
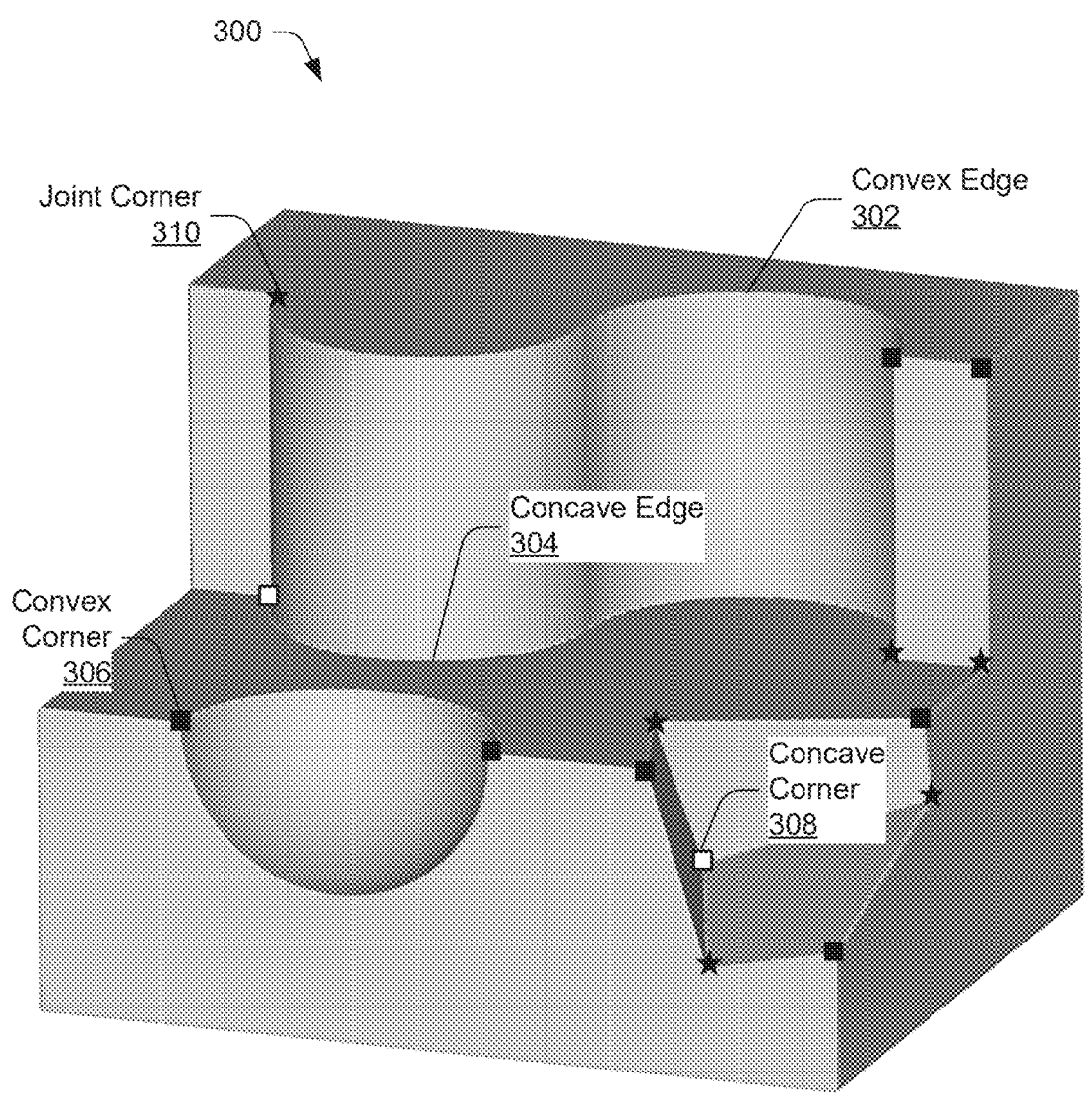
FIG. 3 illustrates an example object with edges and corners to be chamfered using the techniques described herein.

FIG. 3 illustrates an example object 300 with edges and corners to be chamfered using the techniques described herein. In particular, the object 300 includes a number of convex and concave edges, including convex edge 302 and concave edge 304 as two examples. The object 300 also includes a number of corners, including convex corners 306 (marked with black squares), concave corners 308 (marked with white squares), and joint corners 310 (marked with stars) as a few examples.

The machine-learning model 118 then determines four parameters (e.g., a, b, c, and d) representing a chamfer plane 214 (block 204). The plane parameters have float number or numerical values. The chamfer plane 214 is parameterized by the equation: ax+by+cz+d=0, where (x, y, z) are 3D point coordinates. The position of the chamfer plane 214 is relative to the voxel's position, with the chamfer plane 214 crossing through the edge or corner that the voxel represents or contains. For a voxel representing an edge, the chamfer plane 214 is normal to a plane that evenly bisects the edge. For a voxel that represents a corner, the chamfer plane 214 is mathematically computed so that the resulting chamfer at the corner seamlessly joins with the chamfer of the edges that connect to that corner (as illustrated in FIG. 4).

The machine-learning model 118 also determines a chamfer coefficient $\gamma$ to indicate the amount the chamfer plane 214 is moved with respect to its pose determined by the four plane parameters. For a voxel representing an edge, the chamfer coefficient $\gamma$ equal $\cos(\alpha/2)$, where $\alpha$ is the angle between the two planes that create the edge. For a voxel representing a corner, the chamfer coefficient $\gamma$ is mathematically computed similar to the chamfer plane parameters.

For each edge or corner voxel, the processing device then moves the chamfer plane 214 based on the chamfer size 126 and the chamfer coefficient (block 206). In particular, the processing device collects the chamfer planes 214 for each edge and corner voxel in the region 124. The edge or corner voxel nearest the center of the (brush) region 124 is marked or identified as the main voxel and its chamfer plane as the main chamfer plane. Each chamfer plane 214 is then moved by an amount equal to $\gamma X$, where X is the value of the chamfer size 126, along the chamfer plane's normal direction, which is the direction of the 3D vector (a, b, c) from the chamfer plane parameters.

Figure 4:
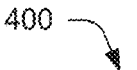
FIG. 4 illustrates an example edge and corner for determination of a chamfer coefficient for accomplishing the chamfer tool techniques described herein.
Figure 4:
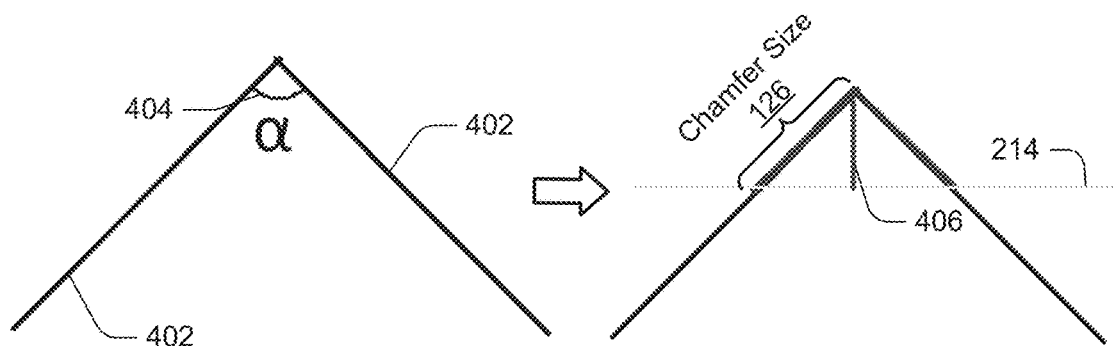
Figure 4:
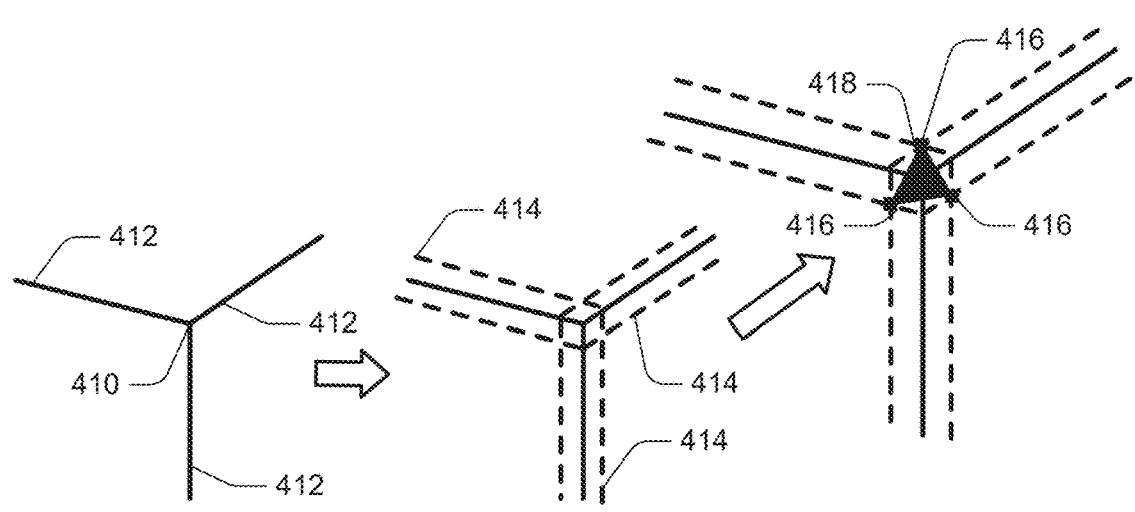

FIG. 4 illustrates an example edge 400 and corner 410 for the determination of a chamfer coefficient for accomplishing the chamfer tool techniques described herein. The edge 400 is shown as a 2D cross-section of a 3D edge and is formed by surfaces 402 with an angle 404 ($\alpha$) therebetween. The chamfer plane 214 is moved a distance 406 in a direction normal to the chamfer plane 214. As described above, the distance 406 is equal to $\gamma X$, where $\gamma$ is the chamfer coefficient and equals $\cos(\alpha/2)$ for voxels representing edges and X is the value of the chamfer size 126.

The corner 410 in a 3D shape is made of three edges 412. To compute the chamfer plane parameters, each edge is chamfered with a chamfer size of one unit. The resulting chamfers 414 have three intersection points 416, which form a plane (e.g., the obtained plane 418). The chamfer plane parameters a, b, and c are equal to those of the obtained plane 418; and the parameter d is computed so that the chamfer plane crosses the corner point. The chamfer coefficient is equal to the distance between the obtained plane 418 and the corner point.

The processing device then generates the chamfer by performing an addition or subtraction operation with the chamfer plane 214 and the 3D object 210 to generate an updated 3D object 216 with a chamfer in the brushed region (block 208).

If the main voxel is a concave edge or corner, the chamfer plane 214 is moved outward and away from the 3D object 210 in the positive SDF direction. The half-spaces of valid chamfer planes intersect the half-space of the main chamfer plane. A valid chamfer plane is a plane that creates a convex edge with the main chamfer plane. The processing device then performs a union operation between the intersected half-space and the original voxels of the 3D object 210 within region 124.

If the main voxel is a convex edge or corner, the chamfer plane 214 is moved inward in the negative SDF direction. The half-space of the main chamfer plane is intersected by the half-spaces of the valid chamfer planes (if any) that create a concave edge with the main chamfer plane. The processing device then performs a subtraction operation between the intersected half-space of the main voxel and the original voxels of the 3D object within the (brushed) region 124.

The processing device performs the CSG operations (e.g., intersection, union, and difference operations) on the signed distance values of the voxels (e.g., by changing signs and relatively simple minimum and maximum operations). As a result, the chamfer operations are performed directly and efficiently on the original SDF voxels of the 3D object 210.

Figure 5:
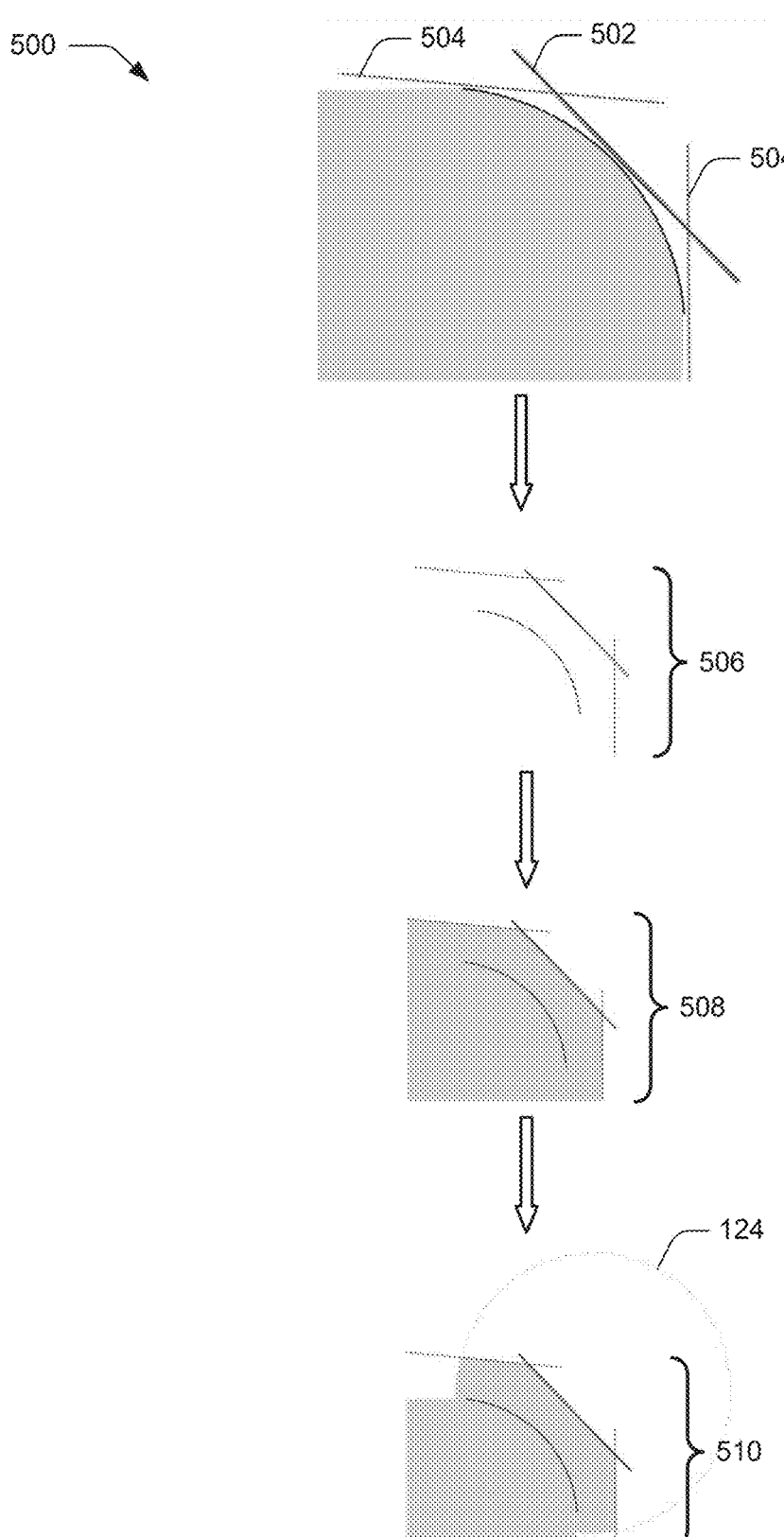
FIG. 5 illustrates an example object with a concave edge to be chamfered using the techniques described herein.

FIG. 5 illustrates an example object 500 with a concave edge to be chamfered using the techniques described herein. After the processing device identifies each edge or corner voxel in the brushed region 124, the processing device determines the planes of each edge or corner voxel. The edge voxel closest to the center of the brushed region 124 is designated the main voxel, with its plane being a main plane 502. The planes of the other edge and corner voxels are designated as other planes 504. If the edge or corner voxels are concave edges or voxels, the main plane 502 and other planes 504 are moved away from the object's surface along their normal direction by a distance equal to the chamfer size 126 multiplied by the chamfer coefficient (step 506).

If the main voxel is a concave edge, the half-space of the main plane 502 is intersected by the half-spaces of other valid planes, where a valid plane is the other planes 504 that create a convex edge with the main plane 502 (step 508). The processing device then performs a union operation between the intersected half-space and the original voxels of object 500 within the brushed region 124 (step 510).

Figure 6:
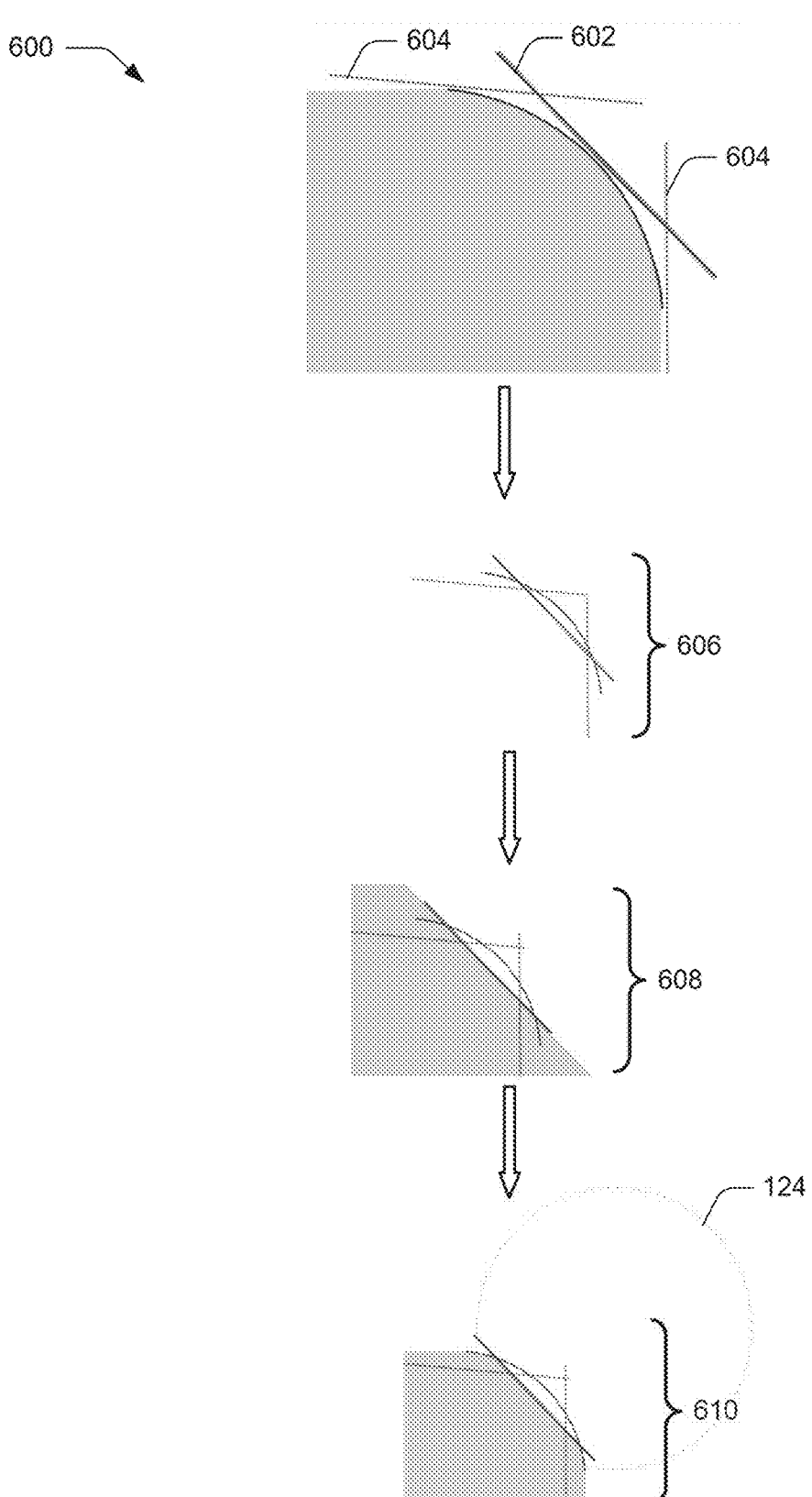
FIG. 6 illustrates an example object with a convex edge to be chamfered using the techniques described herein.

FIG. 6 illustrates an example object 600 with a convex edge to be chamfered using the techniques described herein. After the processing device identifies each edge or corner voxel in the brushed region 124, the processing device determines the planes of each edge or corner voxel. The edge voxel closest to the center of the brushed region 124 is designated the main voxel, with its plane being a main plane 602. The planes of the other edge and corner voxels are designated as other planes 604. If the edge or corner voxels are convex edges or voxels, the main plane 602 and other planes 604 are moved into the object's surface along their normal direction by a distance equal to the chamfer size 126 multiplied by the chamfer coefficient (step 606).

If the main voxel is a convex edge, the half-space of the main plane 602 is intersected by the half-spaces of other valid planes, where a valid plane is the other planes 604 that create a concave edge with the main plane 602 (step 608). There are no valid planes in the illustrated example of FIG. 6, and the intersected half-space is identical to the half-space created by the main plane 602. The processing device then performs a subtraction operation between the intersected half-space and the original voxels of object 600 within the brushed region 124 (step 610).

Example System and Device

Figure 7:
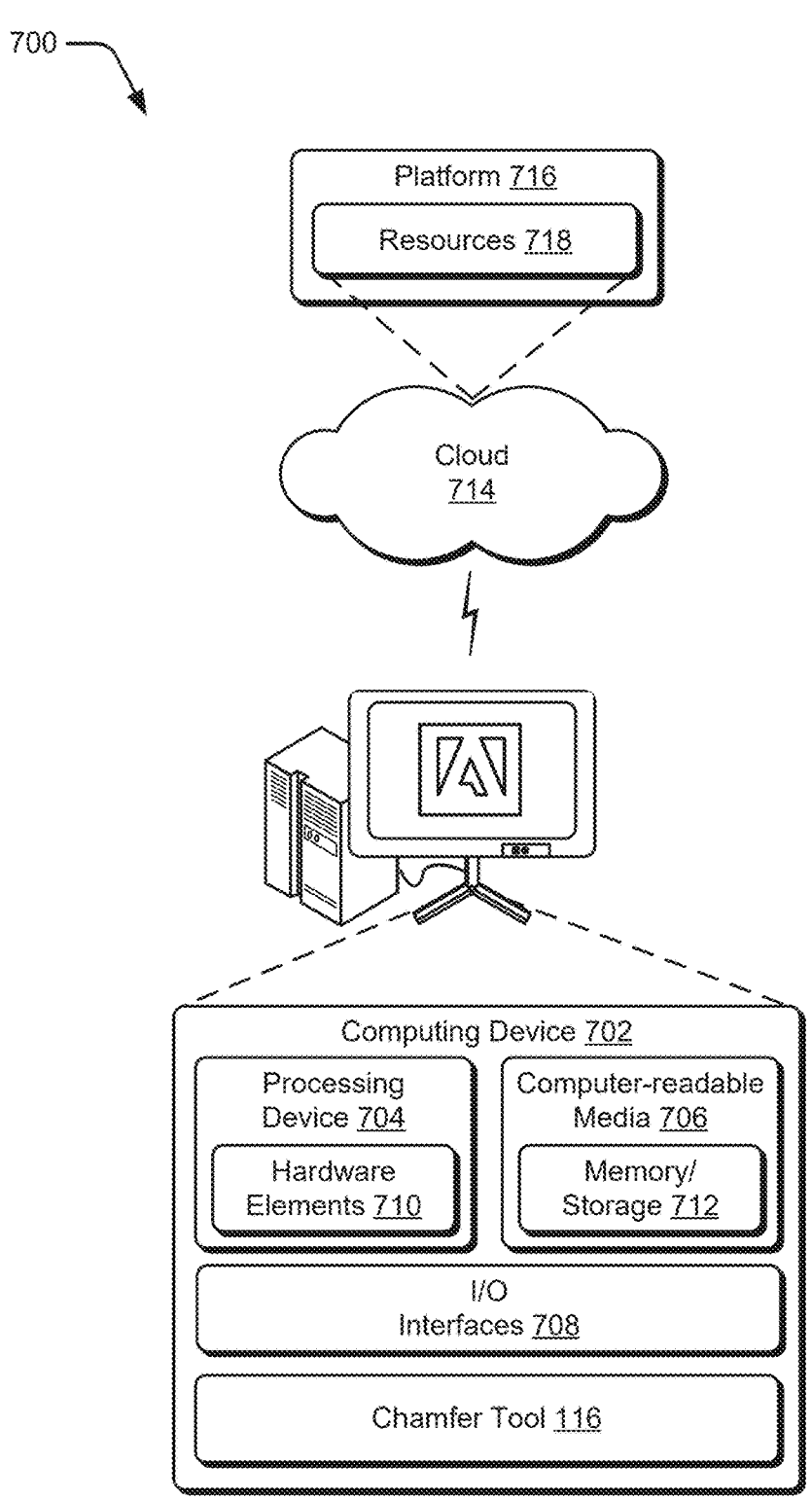
FIG. 7 illustrates an example system including various components of an example device that can be implemented as any type of computing device as described and/or utilized with reference to the previous figures to implement embodiments of the techniques described herein.

FIG. 7 illustrates an example system 700 that includes an example computing device 702 that represents one or more computing systems and/or devices usable to implement the techniques described herein. This is illustrated through the inclusion of the chamfer tool 116. The computing device 702 is configurable, for example, as a service provider server, a device associated with a client (e.g., a client device), an on-chip system, and/or any other suitable computing device or computing system.

The example computing device 702, as illustrated, includes a processing system 704, one or more computer-readable media 706, and one or more I/O interfaces 708 that are communicatively coupled, one to another. Although not shown, the computing device 702 further includes a system bus or other data and command transfer system that couples the various components from one to another. For example, a system bus includes any combination of different bus structures, such as a memory bus or controller, a peripheral bus, a universal serial bus, and/or a processor or local bus that utilizes various bus architectures. Various other examples are also contemplated, such as control and data lines.

The processing system 704 represents the functionality to perform one or more operations using hardware. Accordingly, the processing system 704 is illustrated as including hardware elements 710 that are configured as processors, functional blocks, and so forth. This includes example implementations in hardware as an application specific integrated circuit or other logic device formed using one or more semiconductors. The hardware elements 710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 706 is illustrated as including memory/storage 712. Memory/storage 712 represents memory or storage capacity associated with one or more computer-readable media. In one example, the memory/storage 712 includes volatile media (such as random access memory (RAM)) and/or nonvolatile media (such as read-only memory (ROM), Flash memory, optical disks, magnetic disks, and so forth). In another example, the memory/storage 712 includes fixed media (e.g., RAM, ROM, a fixed hard drive, and so on) and removable media (e.g., Flash memory, a removable hard drive, an optical disc, and so forth). The computer-readable media 706 is configurable in various ways, as described below.

Input/output interface(s) 708 represent functionality that allows a user to enter commands and information to computing device 702 and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in various ways to support user interaction, as further described below.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on various commercial computing platforms with various processors.

Implementations of the described modules and techniques are stored on or transmitted across some form of computer-readable media. For example, the computer-readable media includes a variety of media accessible to the computing device 702. By way of example, and not limitation, computer-readable media includes "computer-readable storage media" and "computer-readable signal media."

"Computer-readable storage media" refers to media and/or devices that enable persistent and/or non-transitory information storage in contrast to mere signal transmission, carrier waves, or signals per se. Thus, computer-readable storage media refers to non-signal-bearing media. The computer-readable storage media includes hardware such as volatile and non-volatile, removable and non-removable media, and/or storage devices implemented in a method or technology suitable for storage of information such as computer-readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium configured to transmit instructions to the hardware of the computing device 702, such as via a network. Signal media typically embodies computer-readable instructions, data structures, program modules, or other data in a modulated data signal, such as carrier waves, data signals, or other transport mechanisms. Signal media also includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic, and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware and hardware utilized to store instructions for execution, e.g., the computer-readable storage media described previously.

Combinations of the foregoing are also employable to implement various techniques described herein. Accordingly, software, hardware, or executable modules are implementable as instructions and/or logic embodied on some form of computer-readable storage media and/or by one or more hardware elements 710. For example, the computing device 702 is configured to implement particular instructions and/or functions corresponding to the software and/or hardware modules. Accordingly, implementation of a module executable by the computing device 702 as software is achieved at least partially in hardware, e.g., through computer-readable storage media and/or hardware elements 710 of the processing system 704. The instructions and/or functions are executable/operable by one or more articles of manufacture (for example, one or more computing devices 702 and/or processing systems 704) to implement techniques, modules, and examples described herein.

The techniques described herein are supportable by various configurations of the computing device 702 and are not limited to the specific examples of the techniques described herein. This functionality is also implementable entirely or partially through a distributed system, such as over a "cloud" 714, as described below.

Cloud 714 includes and/or represents a platform 716 for resources 718. The platform 716 abstracts the underlying functionality of hardware (e.g., servers) and software resources of the cloud 714. For example, resources 718 include applications and/or data utilized while computer processing is executed on servers remote from the computing device 702. In some examples, the resources 718 also include services provided over the Internet and/or through a subscriber network, such as a cellular or Wi-Fi network.

Platform 716 abstracts the resources 718 and functions to connect the computing device 702 with other computing devices. In some examples, the platform 716 also serves to abstract scaling of resources to provide a corresponding level of scale to encountered demand for the resources implemented via the platform. Accordingly, in an interconnected device embodiment, the implementation of functionality described herein is distributable throughout system 700. For example, the functionality is implementable in part on the computing device 702 and via the platform 716, which abstracts the functionality of the cloud 714.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

What is claimed is:

1. A method comprising:
   receiving, by a processing device, an indication of a region of a three-dimensional (3D) object to be chamfered and a chamfer size, the region including multiple voxels in a voxel grid;
   determining, by a machine-learning model, one or more surface voxels in the region that represent an edge voxel or a corner voxel of the 3D object;
   determining, by the machine-learning model, parameters for the edge voxel or the corner voxel of the one or more surface voxels that define a chamfer plane and a chamfer coefficient;
   moving, by the processing device and based on the chamfer size and the chamfer coefficient, the chamfer plane for the edge voxel or the corner voxel in a direction normal to the chamfer plane; and
   performing, by the processing device, an addition or subtraction operation on the 3D object to the chamfer plane for the edge voxel or the corner voxel to generate a chamfer.

2. The method of claim 1, wherein:
   the machine-learning model is a multilayer perceptron;
   for the surface voxel, an input to the multilayer perceptron is an input vector that includes signed distance values for neighbor voxels of the surface voxel; and
   for the surface voxel, an output from the multilayer perceptron is an output vector that indicates whether the surface voxel is the edge voxel or the corner voxel.

3. The method of claim 2, wherein the input vector is a 64-dimensional vector that includes the signed distance values for the neighbor voxels of the surface voxel in a four-by-four-by-four grid surrounding the surface voxel.

4. The method of claim 3, wherein the output vector is a nine-dimensional vector that includes:
   a convex flag value that indicates whether the surface voxel is a convex edge or a convex corner;
   a concave flag value that indicates whether the surface voxel is a concave edge or a concave corner;
   a corner flag value that indicates whether the surface voxel is the convex corner or the concave corner;
   a joint flag value that indicates whether the surface voxel includes at least one convex edge and at least one concave edge;

for each edge voxel or each corner voxel, the parameters that define the chamfer plane, the parameters including four numerical values; and for each edge voxel or each corner voxel, a chamfer coefficient that determines the distance to move the chamfer plane for creating the chamfer.

5. The method of claim 4, wherein the chamfer plane is moved a chamfer distance equal to the chamfer size multiplied by the chamfer coefficient.

6. The method of claim 5, wherein the method further comprises:

identifying one or more chamfer planes in the region;

determining a main chamfer plane of the one or more chamfer planes as the chamfer plane corresponding to a main voxel, the main voxel being the edge voxel or the corner voxel nearest a center of the region; and moving the one or more chamfer planes the chamfer distance along the direction normal to the one or more chamfer planes, the one or more chamfer planes moving away from a surface of the 3D object if the corresponding edge voxel or corner voxel is the concave edge or the concave corner, or into the surface of the 3D object if the corresponding edge voxel or corner voxel is the convex edge or the convex corner.

7. The method of claim 6, wherein the method further comprises:

in response to the main voxel being the concave edge:

determining an intersection of a half-space of the main chamfer plane by half-spaces of other chamfer planes that create convex edges with the main chamfer plane; and performing a union operation between the intersected half-space of the main chamfer plane and the surface voxels of the 3D object within the region; or in response to the main voxel being the convex edge:

determining the intersection of the half-space of the main chamfer plane by the half-spaces of other chamfer planes that create concave edges with the main chamfer plane; and performing a subtraction operation between the intersected half-space of the main chamfer plane and the surface voxels of the 3D object within the region.

8. The method of claim 7, wherein the intersection, the addition operation, or the subtraction operation are performed on the signed distance values of the corresponding surface voxels.

9. The method of claim 1, wherein the indication of the region to be chamfered is input by a user using a brush tool.

10. The method of claim 1, wherein:

the chamfer is applied to a single edge, each concave edge, each convex edge, or each edge in the region; and the method further comprises rendering, by the processing device, the 3D object with the chamfer at the chamfer plane.

11. A computing device comprising:

a processing device; and a computer-readable medium storing instructions that, in response to execution by the processing device, cause the processing device to:

receive an indication of a brushed region of a three-dimensional (3D) object to be chamfered and a chamfer size;

determine, by a machine-learning model, parameters for an edge voxel or a corner voxel on a surface of the 3D object in the brushed region, the parameters defining a chamfer plane and a chamfer coefficient;

move, based on the chamfer size and the chamfer coefficient, the chamfer plane for the edge voxel or the corner voxel in a direction normal to the chamfer plane; and perform an addition or subtraction operation on the 3D object to the chamfer plane for the edge voxel or the corner voxel to generate a chamfer.

12. The computing device of claim 11, wherein:

the machine-learning model is a multilayer perceptron;

for the edge voxel or the corner voxel, an input to the multilayer perceptron is an input vector that includes signed distance values for neighbor voxels of the edge voxel or the corner voxel; and for the edge voxel or the corner voxel, an output from the multilayer perceptron is an output vector that includes the parameters.

13. The computing device of claim 12, wherein the input vector is a 64-dimensional vector that includes the signed distance values for the neighbor voxels of the edge voxel or the corner voxel in a four-by-four-by-four grid.

14. The computing device of claim 13, wherein the output vector is a nine-dimensional vector that includes:

a convex flag value that indicates whether the edge voxel or the corner voxel is a convex edge or a convex corner;

a concave flag value that indicates whether the edge voxel or the corner voxel is a concave edge or a concave corner;

a corner flag value that indicates whether the edge voxel or the corner voxel is the convex corner or the concave corner;

a joint flag value that indicates whether the edge voxel or the corner voxel includes at least one convex edge and at least one concave edge;

four numerical values for the parameters that define the chamfer plane; and a chamfer coefficient that determines the distance to move the chamfer plane for creating the chamfer.

15. The computing device of claim 14, wherein the chamfer plane is moved a chamfer distance equal to the chamfer size multiplied by the chamfer coefficient.

16. The computing device of claim 15, wherein the computer-readable medium stores further instructions that, in response to execution by the processing device, cause the processing device to:

identify one or more chamfer planes in the brushed region;

determine a main chamfer plane of the one or more chamfer planes as the chamfer plane corresponding to a main voxel, the main voxel being the edge voxel or the corner voxel nearest a center of the brushed region; and move the one or more chamfer planes the chamfer distance along the direction normal to the one or more chamfer planes, the one or more chamfer planes moving away from the surface of the 3D object if the corresponding edge voxel or corner voxel is the concave edge or the concave corner, or into the surface of the 3D object if the corresponding edge voxel or the corner voxel is the convex edge or the convex corner.

17. The computing device of claim 16, wherein the computer-readable medium stores further instructions that, in response to execution by the processing device, cause the processing device to:

in response to the main voxel being the concave edge:

determine an intersection of a half-space of the main chamfer plane by half-spaces of other chamfer planes that create convex edges with the main chamfer plane; and perform a union operation between the intersected half-space of the main chamfer plane and surface voxels of the 3D object within the brushed region; or in response to the main voxel being the convex edge:

determine the intersection of the half-space of the main chamfer plane by the half-spaces of other chamfer planes that create concave edges with the main chamfer plane; and perform a subtraction operation between the intersected half-space of the main chamfer plane and the surface voxels of the 3D object within the brushed region.

18. The computing device of claim 17, wherein the intersection, the addition operation, or the subtraction operation are performed on the signed distance values of the corresponding surface voxels.

19. The computing device of claim 11, wherein the computer-readable medium comprises modeling software based on volumetric sculpting with signed distance values for each voxel in a voxel grid.

20. A system comprising:

means for receiving an indication of a region of a three-dimensional (3D) object to be chamfered and a chamfer size, the region including multiple voxels in a voxel grid;

means for determining, by a machine-learning model, one or more surface voxels in the region that represent an edge voxel or a corner voxel of the 3D object;

means for determining, by the machine-learning model, parameters for the edge voxel or the corner voxel of the one or more surface voxels that define a chamfer plane and a chamfer coefficient;

means for moving, based on the chamfer size and the chamfer coefficient, the chamfer plane for the edge voxel or the corner voxel in a direction normal to the chamfer plane; and means for performing an addition or subtraction operation on the 3D object to the chamfer plane for the edge voxel or the corner voxel to generate a chamfer.

\* \* \* \* \*